March 26, 1968 W. R. KOEHN 3,375,310
METHOD FOR MAKING SURGICAL CATHETERS
Filed Feb. 11, 1964 3 Sheets-Sheet 1
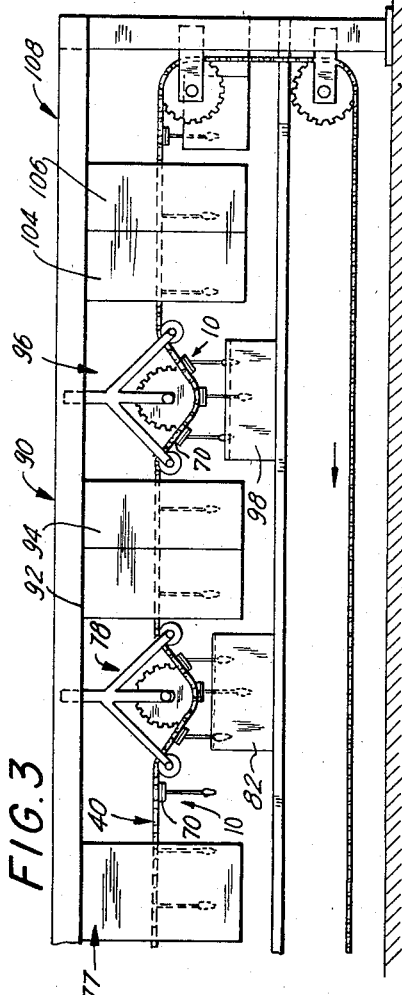
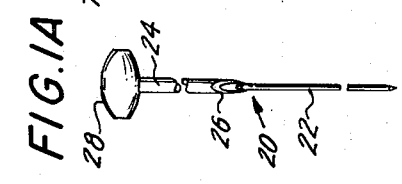
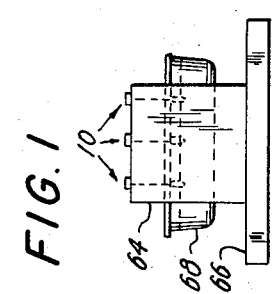
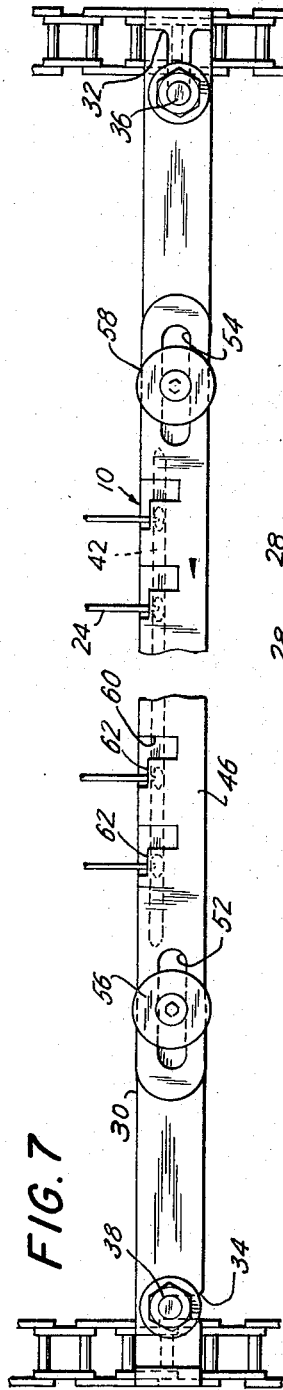
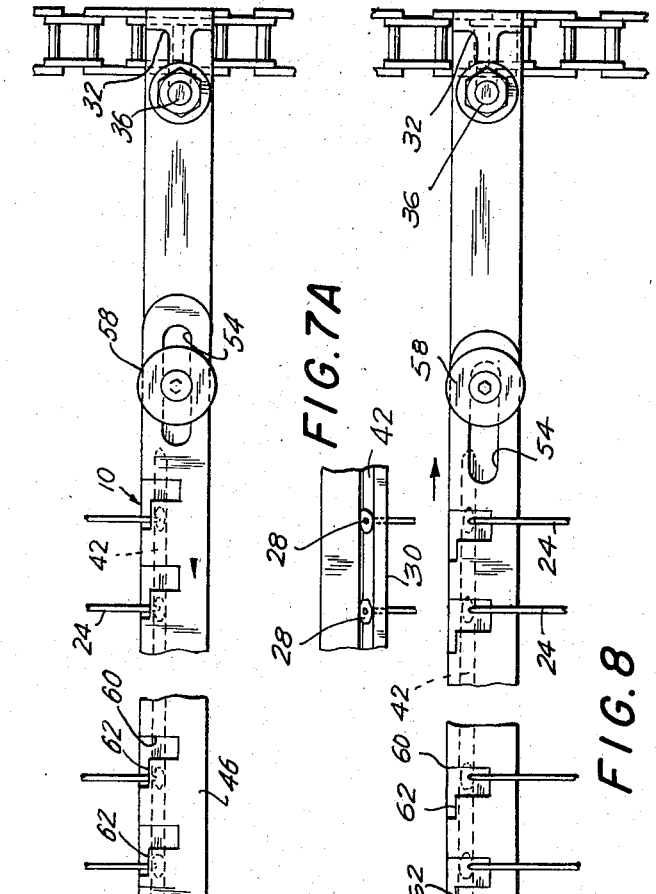
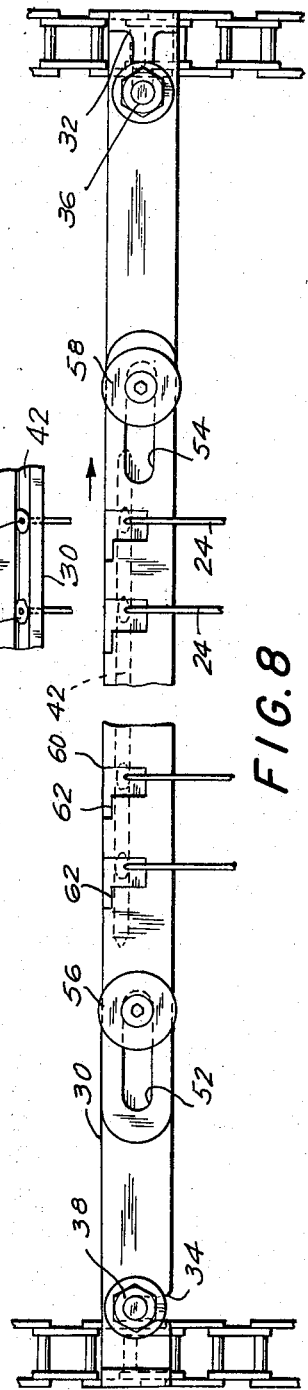
INVENTOR.
WILBUR R. KOEHN
BY
Kane, Dalsimer and Kane
ATTORNEYS

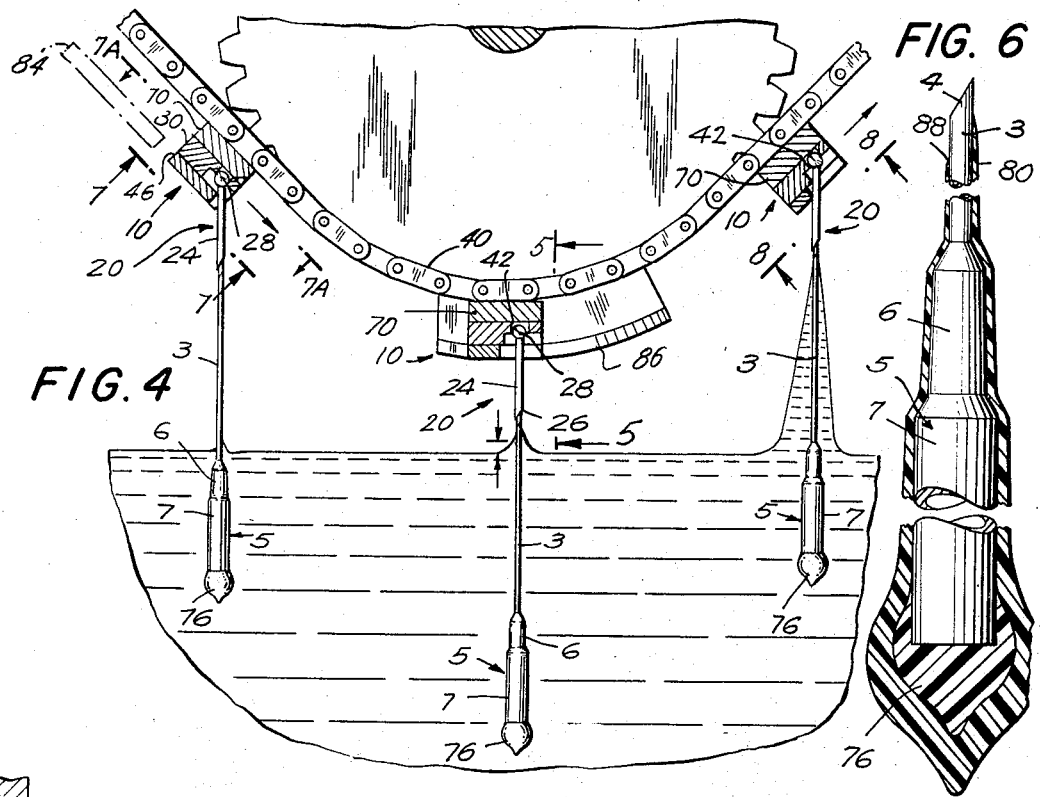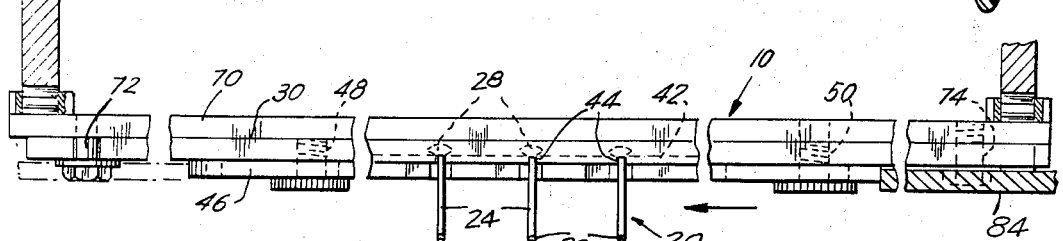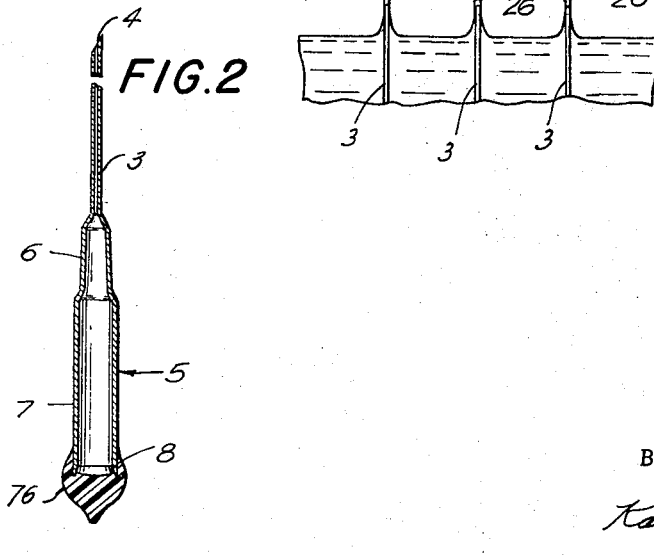

March 26, 1968 W. R. KOEHN 3,375,310
METHOD FOR MAKING SURGICAL CATHETERS
Filed Feb. 11, 1964 3 Sheets-Sheet 3
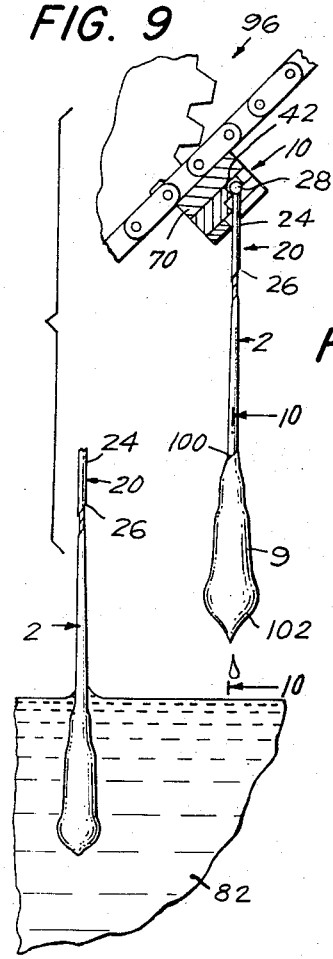
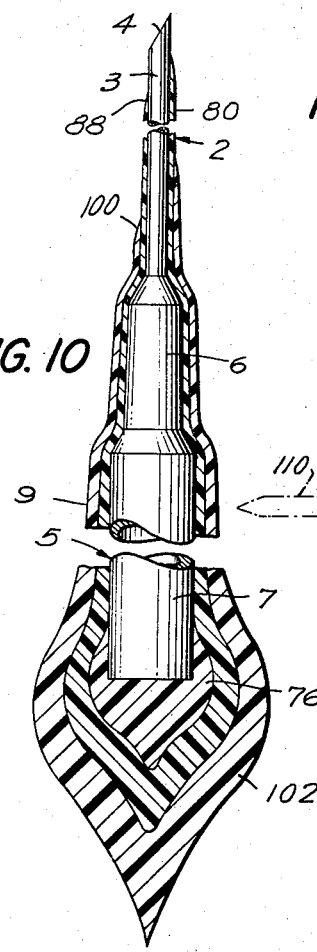
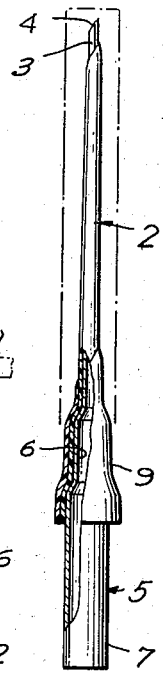
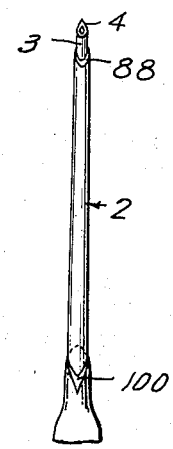
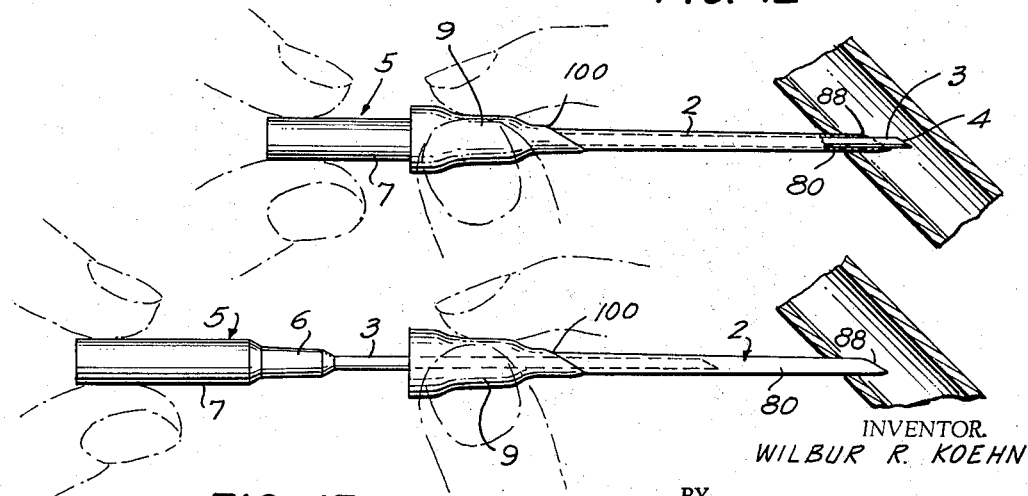
INVENTOR.
WILBUR R. KOEHN
BY
Kane, Dalsimer and Kane
ATTORNEYS United States Patent Office 3,375,310
Patented Mar. 26, 1968

3,375,310
METHOD FOR MAKING SURGICAL CATHETERS
Wilbur R. Koehn, Sands Point, N.Y.
Continuation-in-part of application Ser. No. 82,534, Jan. 13, 1961. This application Feb. 11, 1964, Ser. No. 347,990
6 Claims. (Cl. 264—139)

The present invention relates to surgical catheters and, more particularly, to a method of fabricating a catheter directly on a penetrating element such as a needle and the resulting combined needle and catheter which facilitates the insertion of the catheter into a body cavity of a patient. This application is a continuation-in-part of application S.N. 82,534 filed Jan. 13, 1961 now abandoned.

It is the usual practice in blood transfusions, intravenous feedings, or when fluids are to be withdrawn from the human body to attach a hollow needle to an end of a tube and insert the needle into a vein or other body cavity. The fluid then flows from a source through the tube and hollow needle into the body when fluids are to be delivered thereto, or from the body through the needle and tube when fluids are to be withdrawn. Repeated punctures of veins with metal needles tend to cause venus thromboses and subcutaneous hematomas. To avoid this result, the metal needle is sometimes left in the body. However, the metal needle is apt to cause an infection and the part of the body where the needle is inserted must be immobilized with considerable discomfort to the patient. This is especially true when the needle is inserted into a vein as, for example, in the arm where relative movement might cause a puncturing of the vein and produce additional trauma. To prevent such relative movement, the arm is usually strapped in a fixed position.

Obviously, it is desirable to insert the end of a relatively soft, flexible catheter into the body cavity, in place of a metal needle, to eliminate the necessity of immobilizing the arm or other portion of the body of the patient and the resulting discomfort and, at the same time, assure proper feeding of fluids. In my prior application S.N. 690,709 filed Oct. 18, 1957, entitled, Method of and Apparatus for Applying Catheters, now granted Patent No. 3,030,953, a combined needle and catheter tube is described and claimed for leading the end of the catheter into a cavity body after which the needle is withdrawn. While the combined needle and catheter disclosed in my prior application operates satisfactorily, the catheter tube and needle are made separately and assembled one on the other and the needle requires a head of a special construction.

One of the objects of the present invention is to provide an improved method of fabricating a catheter directly on the needle used to insert the end of the catheter in a body cavity.

Another object is to provide an improved needle and catheter in a self-contained sterile unit which facilitates the insertion of the end of the catheter into a body cavity and the removal of the needle therefrom.

Still another object is to provide an improved catheter and needle unit which is of relatively simple and compact construction, adapted for economical manufacture as a disposable unit and one which is reliable in operation for inserting the end of a plastic catheter into a body cavity.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

FIG. 1 is a side elevational view illustrating the initial step of the method of this invention whereby needles are suspended from racks and the opening at the hub end of each needle is plugged by dipping these ends in a vinyl resin liquid dip;

FIG. 1A is an elevational view of a wire element employed to suspend a needle from a rack during the catheter formation process;

FIG. 2 is a longitudinal sectional view of the needle having its hub end plugged in accordance with the step represented by FIG. 1;

FIG. 3 is a side elevational view of sequentially arranged vinyl resin dipping stations combined with heating stations traversed by a moving conveyor adapted to mount the racks having suspended therefrom the needles having their hub ends plugged;

FIG. 4 is an enlarged fragmentary view of the initial dipping station of the equipment of FIG. 3 at which the conveyor-carried racks, having suspended needles with their hub ends plugged, pass the suspended needles through a vinyl resin liquid dip to an extent whereby the level of the solution is adjacent the penetrating ends of the needles;

FIG. 5 is an enlarged end elevational view fragmentarily illustrating the suspended needles passing through this initial liquid resin dip;

FIG. 6 is a longitudinal sectional view illustrating the tapered coating applied by this dipping step;

FIG. 7 is an enlarged fragmentary sectional view taken along the line 7—7 of FIG. 4 illustrating the racks for suspending the needles showing the disposition of the rack which results in the fixation of the angular relationship of the suspended needles while being passed through the liquid dip; FIG. 7A is a fragmentary view taken along 7A—7A of FIG. 4;

FIG. 8 is a similar fragmentary sectional view taken along the line 8—8 of FIG. 4 showing the disposition of the rack at which time the needles are freely suspended therefrom;

FIG. 9 is a fragmentary elevational view showing the passage of the coated needle of FIG. 6 through the second dipping step at which a further layer of resin is applied to the hub end for purposes of thickening the coating at this location;

FIG. 10 is a longitudinal sectional view of the coated needle following the second dipping step;

FIG. 11 is a side elevational view of the needle with the cured resin coating forming a catheter with the hub end of the catheter trimmed to expose a portion of the hub of the hypodermic needle;

FIG. 12 illustrates the manner of inserting the end of the needle and catheter assembly into a body cavity;

FIG. 13 is a view similar to FIG. 12 showing the manner in which the inner needle is withdrawn from the catheter; and FIG. 14 is an enlarged fragmentary elevational view of the V-notch formed by the second dipping step and which serves as an indicator of the bevel of the needle.

In accordance with the method of the present invention and with specific reference to FIGS. 11, 12 and 13, a catheter tube 2 of a plastic resin is fabricated directly on the needle 3 with which it is used whereby the needle constitutes a mandrel to form the inside of the catheter to the desired shape. Surprisingly, such a plastic catheter 2 formed directly on the needle 3 can be easily and quickly removed, after the pointed end of the needle and adjacent end of the catheter have been inserted into the body cavity, by merely withdrawing the needle with one hand while the catheter is held by the other hand.

In accordance with the present invention, a hollow needle 3 is provided having a beveled cutting edge at one end 4 and a handle 5 at the opposite end. Needle 3 must have a smooth peripheral surface which may be of the same diameter throughout its length, or tapered outwardly from the pointed end 3, but must not taper inwardly or have any recessed areas rearwardly of the pointed end. The hollow needle 3 may be formed in a conventional way by drawing a seamless tube of, for example, stainless steel through a forming die and the end 4 pointed by grinding it on a bias to provide a sharp cutting edge extending rearwardly around the entire periphery of the end of the needle. The handle 5 is also hollow and surrounds the shank of the needle adjacent its rearward end. Thus, when the pointed end 3 of the needle is inserted into a vein, blood will flow through the needle and hollow handle. The handle 5 may be made of any suitable chemically inert material which will withstand the temperature required to cure the plastic catheter. For example, the handle may be composed of Teflon or nylon or any other chemically inert plastic or may be composed of metal. As shown in the drawings, the exterior of the handle 5 has a reduced and tapered portion 6 adjacent the needle 3 and a cylindrical portion 7 projecting rearwardly from the reduced portion 6. The interior of the outer end of handle 5 has a conical tapered portion 8 of a shape corresponding to the shape of the portion 6. The tapered portions 6 and 8 constitute standard Luer fittings and the fitting 8 adapts the handle 5 to be mounted on a conventional syringe for holding the needle and catheter.

The catheter 2 may be made from any suitable chemically inert and non-toxic plastic resin which is stiff enough to follow the pointed end 4 of the needle 3 through human tissue and flexible enough to conform to the contour of body cavities into which it is inserted. For example, the catheter 2 may be made from plastisols or organisols of vinyl resin or polyethylene resin in solution or suspension. As used herein, the term plastisols comprise particulate suspensions of the plastic resin in a liquid plasticizer; and the term organisols comprise plastisols containing a thinner. For example, if the catheter 2 is to be made of vinyl resin, the resin in a fine, granular form is dispersed in a suitable plasticizer, such as di-octyl phthalate, which may be further diluted to a desired consistency by the addition of a suitable thinner, such as naphtha or other volatile liquid miscible with the plasticizer which will not produce solvation of the vinyl particles. When the catheter is to be made of polyethylene, the resin may be dissolved in any suitable hot solvent, such as, for example, one of a group including xylene, toluene or amyl acetate at a temperature above 140° F. Instead of a hot solution, the granular polyethylene resin may be dispersed in a cold suspension of, for example, xylene and the needle 3 heated above the temperature of 140° F. The heated needle then dissolves the resin granules and produces a thin uniform coating on the needle and, simultaneously, evaporates the thinner, or diluent to leave a continuous film of the pure plastic. While two examples of vinyl and polyethylene resins have been given, it will be understood that dispersions, suspensions or solutions of any other suitable plastic resin of a consistency for dipping may be used.

The plastisol, organisol, suspension or solution of the plastic material is placed in a tank and maintained at the proper temperatures and/or consistency to produce a liquid coating of the desired thickness when the needle 3 is dipped therein. When dipping, the entire needle 3 is immersed in the liquid dip to a depth so that all except the pointed end 4 is coated. It is desirable that the end of the catheter is substantially parallel to the bevel of the needle. This may be accomplished by holding the needle statically at an angle so that the plane of the flat beveled end 4 is substantially parallel to the surface of the liquid plastic dip in the tank. In this context, the needles may be held by wires having an angular end extending into the hollow ends of the needles to support them at the proper angle. The needle or needles 3 are immersed to a depth at which the level of the liquid containing the plastic material is closely adjacent and parallel to the flat pointed end 4. After dipping, the needles 3 are withdrawn from the tank with a coating of the plastic thereon. The desired angular relationship of the bevel of the needle and catheter may also be formed dynamically as discussed below.

In accordance with a modified method of coating the needle 3 as shown herein, the needle is immersed vertically so that only the pointed end 4 projects above the surface of the solution in the tank and the needle moved bodily in a direction at right angles to the point of the needle. The horizontal movement of the needle through the viscous material causes it to pile up in front of the needle in a wave to coat the needle in a plane roughly parallel to its beveled end 4.

The needle 3 coated with a film of the liquid plastic is then hung from its pointed end 4. In the case of organisols, the coating may be heated at a low temperature to drive off the thinner, or diluent. During the hanging operation, the coating tends to run down the sides of the needle and handle 5 by gravity and produces a layer of gradually increasing thickness from adjacent the pointed end of the needle 3 to the lower end of the handle 5. Following the hanging and dripping operations, the entire assembly is subjected to a temperature which will cure the liquid plastic coating and form a stable plastic layer. For example, when the needle is coated with a plastisol or organisol of a vinyl resin, it is heated in the neighborhood of 350° F. for a period of approximately four minutes. In addition to curing the plastic, the 350° F. temperature sterilizes the needle and plastic coating thereon. When the needle 3 and handle 5 are preheated and dipped in a cold suspension of polyethylene, for example, the heated needle causes the particles of plastic adjacent the needle to go into a solution which gel at the surface of the needle. The further heating of the gelled solution on the needle then produces a complete solvation of the polyethylene resin particles which are fused in a solid body of the clear plastic. Furthermore, the heat drives out the solvent in the coating.

After the needle 3 has been dipped to form the coating and then heated to cure the plastic, the enclosed coating is cut on a circular line around the periphery of the handle 5 to complete the form of the catheter 2. A cap or shield is then applied over the needle 3 and catheter 2 thereon. The assembly may now be packaged in sterile condition or, subsequently, sterilized as, for example, by gas sterilization techniques known to the art.

Preferably, the needle 3 is twice dipped in liquids containing plastics and at different consistencies to form a catheter 2 having a relatively thin and flexible tube and a thicker and stiffer conical catheter hub 9. For purposes of description, let it be assumed that the catheter 2 is to be made of a vinyl resin. The entire needle 3, except the pointed end, is first dipped into an organisol of the vinyl resin comprising about 50% plasticizer and sufficient thinner to produce a coating, when cured, having a thickness of from .005 inch to .008 inch at its end adjacent the pointed end of the needle and a thickness of from .010 inch to .013 inch at the conical section 6. The vinyl coating is then cured at a temperature of approximately 350° F. for approximately four minutes. The handle end 5 of the needle 3 only is then redipped in a plastisol of the vinyl resin comprising approximately 35% plasticizer, but only to a point just above the junction of the needle and handle. The more viscous plastisol then deposits a thicker layer of the plastic on the tapered portion 6 of the handle 5. The second coating of vinyl resin adheres with the underlying coating and the product is again cured at a temperature of approximately 350° F. for another period of approximately four minutes to cause coalescence of the coatings. The resulting catheter has a relatively soft, flexible tube extending from adjacent the pointed end of the needle to the handle 5 and a harder and thicker conical end portion 9. When other plastic resins are used, the liquids containing the plastics are so formed as to produce a thin coating on the needle shank and a thicker and stiffer coating of the conical portion 6 of the handle 5.

In accordance with the illustrated and somewhat preferred specific embodiment of the method of fabricating the proposed needle and catheter assembly, reference is now made to FIGS. 1 to 11. Initially, a number of the hypodermic needles 3 are suspended from wire elements 20 which include a lower wire 22 adapted to be received by the lumen of the needle 3 to frictionally hold the latter in a suspended position. The wire 22 extends into an enlarged rod 24 the junction of which is beveled at 26 for purposes of properly orienting the needle 3 on the wire element 20. The upper end of the rod 24 terminates in an ellipsoidal or similarly shaped member 28.

The ellipsoidal member 28 is suspended from the supporting racks 10 which will now be described with the needles 3 thereafter mounted on the wire element 20 with the lower wire 22 frictionally engaging the lumen of the needle.

The racks 10, as well as the wire elements 20, are reusable items thereby adding to the low cost nature of the item fabricated in accordance with the invention. As explained, the racks can serve to suspend the hypodermic needles 3 through the intermediary of the wire elements 20 through the contemplated dipping steps. Each rack 10 (see FIGS. 4, 5, 7 and 8) includes a top plate 30 suitably recessed at each end 32 and 34 for receiving projecting lugs 36 and 38, respectively, of a continuously and somewhat constantly moving conveyor 40 to be described in detail shortly in connection with the dipping and curing stations. The top face of the plate 30 is formed with a longitudinally extending groove 42 which is adapted to conveniently receive the entire ellipsoidal member 28 of the wire element 20. At preset intervals depending upon the number of wire elements 20 desired to be suspended by the rack 10, the recess 42 is counterbored or otherwise provided with spaced openings 44. These openings are provided with sufficient dimension transversely of the major axis of the plate in order to permit free movement therein of the upper rod 24 during traversal of the dipping stations. In this connection, the slot or groove 42 is preferably provided with a cured or arcuate shape in section in order to facilitate pivoting or rotation of the ellipsoidal member 28 therein in a manner to be appreciated shortly.

A lower plate 46 is disposed beneath the plate 30 and is permitted limited longitudinal sliding movement relative thereto for purpose to be explained shortly. This slidable connection is provided by means of threaded shafts 48 and 50 extending downwardly from the upper plate 30 into slots 52 and 54, respectively, in the lower plate 46. Nuts 56 and 58 are threaded on the respective shafts 48 and 50 to maintain this desired slidable association of the two plates 30 and 46. This lower plate 46 is provided with a number of cut-out sections 60 corresponding in number with the openings 44 provided in the top plate 30 for reception freely therein of the suspended wire elements 20. Each of these cut-out portions 60 is provided with a laterally extending shoulder 62 which, when the lower plate 46 is shifted to the right as viewed in FIG. 7, is adapted temporarily to latch or lock the rod 24 of the wire elements 20 in an inclined position relative to the rack 10, this incline position being clearly shown in FIG. 4. Naturally, when the lower plate 46 is shifted to the left in FIG. 7, the wire element 10 would then be freely suspended from the rack 10, this freely suspended condition being represented by FIG. 8.

The initial step in the dipping cycle is shown in FIG. 1 where the racks 10, with suspended needles 3 through the intermediary of the wire elements 20, are suitably supported by means of the support 64 on stand 66 over a tank 68. The support 64 straddles a tank 68 containing a resin dipping solution or suspension preferably of the vinyl type. It should be understood that the hub end can be otherwise suitably plugged and by the employment of other suitable and compatible materials such as wax and the like. The relationship of the suspended needles 3 to the level of the solution in the tank 68 is such that the opening at the hub end of each needle is adapted to be immersed in the solution. In this manner, the opening can be plugged in the manner represented by FIG. 2 to prevent resin during the later dipping applications from coming into contact with internal surfaces of the needle.

The racks 10, with mounted needles having their hub ends plugged, are suspended from movable conveyor 40. In this connection, at preset intervals this conveyor is provided with transversely extending bars 70 having downwardly extending lugs 72 and 74 adapted to be conveniently received by the respective slots 34 and 32 at the ends of the plate 30. These bars 70 serve the additional function of locking the ellipsoidal members 28 in the curved groove 42.

The suspended needles 3 and, particularly, the resin plug 76 (see FIG. 2) are subjected to a quick curing step by passing through the heating station 77. The extent of curing, naturally, should be sufficient to permit the resin plug 76 to set up and prevent passage of this hub end of resin dipping solution of the subsequent dipping stations. Under these circumstances, the temperature and time to which the plug 76 is exposed to the heating station is variable over wide limits.

Since the conveyor 40 is constantly in motion, the suspended needles 3, having their hub ends plugged, approach the next dipping station 78 at which point a resin coating is applied to the entire exterior of the needle, the upper penetrating end thereof excluded, as shown in FIG. 6 to form a tapered resin layer 80. In accomplishing this dipping technique at station 78, reference is now made to FIGS. 4 and 5. As the conveyor 40 approaches the station 78, a forwardly as well as downwardly trajectory or path of travel is assumed by the racks 10. Since the needles as well as their supporting wire members 20 are suspended freely therefrom, a substantially vertical disposition is still maintained notwithstanding the change in path of travel of the rack 10. It will be appreciated, however, that, in view of the consistency of the resin dipping solution in the tank 82, the needles 3 together with the supporting wire elements will have a tendency to drag and assume an acute angle with the upper level of the dipping solution. This effect is circumvented by subjecting the lower plate 46 to a cam face 84 which will shift the lower plate 46 to the position depicted by FIG. 7 at which the suspended needles 3 and wire elements 20 are fixed in an angular position with respect to the rack 10 which, in actuality, will be in a substantially vertical position. As the path of travel of the rack 10 approaches the lowermost point, as shown in FIG. 4, the disposition of the suspended needle and wire element will be at right angles with respect to the level of the dipping solution. Immediately thereafter, a second cam 86 is encountered by the lower plate 46 whereby this plate is shifted to its normal position as represented by FIG. 8. The needles 3, however, have gone through the desired extent of immersion or penetration into the dipping solution in the tank 82. The dipped needles 3 will then be elevated and lifted out of the dipping solution. As the needles pass through the dipping solution, the upper level of the solution will be higher at the leading side because of the motion of the needle. This produces an extremely desirable configuration in the upper or forward penetrating end of the cannula by providing essentially a bevel resembling a V-notch 88 which approaches a substantially symmetrical disposition and form with respect to the beveled piercing or penetrating end 4 of the needle 3. This waving of the surface of the dipping solution is clearly illustrated in FIGS. 4 and 5.

After passage of the suspended needles through the first dipping station 78, they are passed through heating station 90 to regulate and set the thickness of the resin layer 80. It should be understood that the resin layer 80 is advantageously tapered in accordance with the invention. This taper is obtained by permitting the dipped resin layer to run off or drip, relying upon the surface tension and viscosity of the resin for the desired taper and thickness. In other words, the dipped layer of resin on the needle 3 will be in excess of that desired, with the excess being permitted to run off.

The thickness and taper of the resin layer is controlled. This is accomplished by means of a first heating step 92 at this station 90. This heating step 92 controls the rate of run-off of the resin, by varying viscosity. At such time as the desired taper and thickness is obtained which is ascertainable and controllable, the layer 80 is then exposed to a second heating step 94 of the heating station 90. This heating step serves to fix the taper and thickness of the layer 80. At this stage of the heater art, it is now possible to provide these heating steps 92 and 94 with so-called "fingertip" temperature control for attaining the optimum in taper and thickness regulation. It should be understood that this temperature control is adjustable to compensate for the variable conditions that may be encountered as, for example, the temperature of the ambient. Sight should not be lost of the fact that the conveyor 40 is still continuously moving even when the suspended needles are passed through the heating station 90. It has been found that, in view of the excess of resin applied, the longitudinal taper as well as the thickness and symmetry of the layer 80 will be substantially even in section through out as a result of the permissible dripping or run-off period. Contributing to these desired results is the fact that throughout the process of dipping and heat exposure, the needles are maintained in a substantially vertical position.

The second heating step 94 of the heating station 90 serves to gel to thereby fix the desired wall thickness and also to cure partially the coating or layer 80. In a successful application of the invention, the first heating step embraced temperature of 100°–165° F. and a length of about three feet while the conveyor travelled at a rate of one foot per minute. The second heating step embraced temperatures of 300°–350° F. and an effective length of five feet.

The suspended needles are then passed through the hub dipping station 96 at which point the hub portion only of the suspended needles with the layer 80 thereon is dipped into a vinyl resin dipping solution or suspension to thicken the resin at this point. The sequence of events with respect to the operation of the rack 10 simulates that discussed in connection with the first dipping station 78. Thus, the freely suspended needles and wire elements 20 as they approach the level of the liquid dip resin in the second tank 98 are fixed in an angular disposition with respect to the mounting racks by means of a first cam acting upon the lower plate 46 to lock the suspended wire elements 20 and, consequently, the engaged needles in the position depicted by FIG. 7. The hub end of the suspended needle is then passed through the liquid dip with a wave generated resembling that depicted by FIG. 9. Immediately thereafter, the second cam comes into play returning the lower plate 46 of the rack to the position depicted by FIG. 8 at which point the wire elements and suspended needles are freely suspended from the racks. The generation of the mentioned wave in the hub dipping station produces a V-notch 100 which serves the purpose of providing a visual indication of the heel of the penetrating end 4 of the needle 3. The layer or coating 102 formed by the hub dipping step is similarly permitted to drip or run off and similarly is exposed to two heating steps 104 and 106 of the second heating station 108. The first heating step 104 controls the extent of drip by affecting the viscosity of the liquid dip of the second hub dip 102. The second heating step 106 partially cures and gels this coating 102. As previously explained, the thickening layer 102 and the inner layer 80 coalesces so that they appear structurally and functionally as a unit. In the above stated successful applications of this invention, the heating step 104 embraced temperatures of 150°–325° F. and a path length of 3' while the second heating step embraced temperatures of 330°–370° F. and a length of 5', the conveyor traveling at a rate of one foot per minute.

The resin hub is then cut to expose the hub 7 of the inner needle as shown in FIG. 11. The cutting step is so performed by means of a rotary cutting blade or knife 110, for example (FIG. 10), that the seal existing between the now formed catheter 2 and the needle 3 is partially broken to facilitate slidable movement of these parts one with respect to the other when in actual use and application as illustrated in FIGS. 12 and 13 and as discussed in connection with the text applicable thereto.

In summary, the pointed end of the combined catheter 2 and needle 3 then is inserted through the tissue of the human body into a cavity, such as a vein, as illustrated diagrammatically by the reference character V. Due to the close fit of the forward end of the catheter 2 with the periphery of the needle 3 on which it was formed and the thinness of the end of the catheter 2, due to flow of the plastisol along the needle, the end of the catheter follows the pointed end of the needle into the body cavity. When the ends of the needle and catheter have entered a body cavity, such as a vein V, blood will flow through the hollow needle 3 and handle 5 to indicate that the end of the catheter is properly positioned, as illustrated in FIG. 12. The rearward end or conical hub 9 of the catheter 2 is then held between the forefinger and thumb of one hand while the handle 5 of the needle 3 is held between the forefinger and thumb of the other hand and withdrawn relative to the catheter 2, as illustrated in FIG. 13. Due to the method of making the tapered thickness of the wall of the catheter 2, the catheter 2 will retain its original shape without buckling while the needle 3 is being withdrawn. As a result, the end of the catheter 2 remains in the body cavity as the end of the needle 3 is withdrawn. After the needle 3 is withdrawn, the catheter 2 is sufficiently flexible to follow the contour of the part in which it has been inserted without cutting or otherwise damaging the surrounding tissue.

As stated above, the needle 3 and handle 5 constitute a mandrel for forming the shape of the inside of the catheter 2. Thus, the internal taper 8 at the outer end of handle 5 provides a Luer type fitting for attaching the needle 3 to a standard syringe for inserting the catheter 2. The thicker conical hub 9 of the catheter produces a tapered fitting into which a tapered fitting may be inserted after the needle 3 has been withdrawn to connect the catheter to an extension tube. Fluids then may be supplied to or withdrawn through the catheter 2. When it is desired to use intermittently the catheter 2 as, for example, to give intravenous feeding through the catheter 2 at intervals of time over a long period, a correspondingly tapered adaptor with attached extension tube is used alternately with a rod type plug or stopper, more commonly referred to as an obturator, for preventing a reverse flow between periods of use. This rod type plug may be composed of a suitable plastic and coated with an anti-coagulant substance, such as heparin, to prevent blood from clotting or from sticking to the plug. The plug also may include a relatively large amount of a bacteriostatic material such as organic compounds of tin and quaternary ammonium compounds, which are molded therein and have a bactericidal effect even when originally located at a distance from the organism.

In addition to providing a method of fabricating a catheter, the present invention provides a novel form of combined needle 3 and catheter 2. As shown, the catheter 2 has a beveled end 16 at least roughly parallel to the flat beveled end 4 of the needle 3, and of an extremely smooth, thin and rounded contour 17 from the outer periphery of the needle shank 3 to the outer periphery of the catheter 2. In addition, the catheter 2 has a wall of gradually increasing thickness from the rounded end 17 to its opposite end. Furthermore, the catheter 2 has an adapter hub 9 with an internal standard Luer fitting of conical shape formed as an integral part of the catheter and of greater wall thickness than the tube section. In addition, the catheter 2 has a close, perfect fit on the outer periphery of the needle 3 because of the method by which it is made. Of prime importance is the integral one-piece construction of the catheter.

It will now be observed that the present invention provides an improved method of making a catheter directly on the needle with which it is used to insert the catheter in a body cavity. It will also be observed that the present invention provides an improved needle and catheter in a self-contained sterile unit which facilitates the insertion of the end of the catheter into a body cavity and the removal of the needle therefrom. It will still further be observed that the present invention provides an improved catheter and needle unit which is of relatively simple and compact construction, adapted for economical manufacture and one which is reliable in operation for inserting the end of a plastic catheter into a body cavity.

The advantages incident to the catheter needle of this invention are many and are best understood and appreciated only upon a comparison with heretofore proposed catheter needles which will not be undertaken at this time for the sake of brevity. Needless to say, the numerous aforenoted objects and advantages, among others, are most effectively attained by the inventive proposals herein.

While alternate steps of a method and a single form of combined catheter and needle are herein described and illustrated, it will be understood that the steps of the method and form of the resulting product may be changed and modified within the scope of the present invention. Therefore, without limitation in this respect, the invention is defined by the following claims.

I claim:

1. The method of fabricating a catheter needle for insertion into a body cavity comprising a catheter and penetrating element wherein the penetrating element is adapted to be withdrawn by sliding the penetrating element rearwardly while the catheter is being held following insertion of the catheter needle into the body cavity comprising the steps of: providing a penetrating element having a hub at one end and a pointed end at the other and with an intermediary shank therebetween; dipping the hub and shank of the penetrating element into a plastic resin in liquid phase to a level adjacent its pointed end to coat the shank and hub with a continuous layer of liquid resin; thereafter subjecting the plastic resin with a first heat application to alter the viscosity of the plastic resin coating to a predetermined level and substantially simultaneously suspending the coated shank and hub from the pointed end of the penetrating element permitting the resin layer to run off and flow under the influence of gravity sufficiently to obtain a predetermined taper and thickness so as to produce a tubular wall of gradually and progressively increasing thickness from a thin end having a substantial knife edge adjacent the pointed end of the penetrating element along the shank thereof toward the hub for substantially the entire length of said shank; subjecting the coated penetrating element to a second heat application to convert it from a liquid to a substantially solid phase and partially cure it sufficiently to the wall thickness; and then serving the plastic resin around the hub and removing the end from the hub farthest the pointed end of the penetrating element, whereby to form a catheter needle.

2. The method of fabricating a catheter needle for insertion into a body cavity, comprising a catheter and penetrating element wherein the penetrating element is adapted to be withdrawn by sliding the penetrating element rearwardly while the catheter is being held following insertion of the catheter needle into the body cavity comprising the steps of: providing a penetrating element having a hub at one end and a pointed end at the other and with an intermediary shank therebetween; dipping the hub and shank of the penetrating element into a first plastic resin in liquid phase to a level adjacent its pointed end to coat the shank and hub with a continuous level of liquid resin; thereafter subjecting the plastic resin with a first heat application to alter the viscosity of the plastic resin coating to a predetermined level and substantially simultaneously suspending the coated shank and hub from the pointed end of the penetrating element permitting the resin layer to run off and flow under the influence of gravity sufficiently to obtain a predetermined taper and thickness so as to produce a tubular wall of gradually and progressively increasing thickness from a thin end having a substantial knife edge adjacent the pointed end of the penetrating element along the shank thereof toward the hub for substantially the entire length of said shank; subjecting the coated penetrating element to a second heat application to convert it from a liquid to a substantially solid phase and partially cure it sufficiently to fix the wall thickness; thereafter dipping the suspended penetrating element into a second plastic resin in liquid phase, of a thicker mixture than the first liquid plastic resin, to a point whereby the hub is immersed to produce a thicker and stiffer coating on the hub; thereafter treating the plastic resin coating of the second dipping step with a first application of heat to regulate the viscosity of this coating to a predetermined level to thereby control the extent of drip and then to a second heating application which converts the liquid resin of the second dipping step to a solid phase and partially cures it; and then severing the plastic resin around the hub and removing the end from the hub farthest the pointed end of the penetrating element, whereby to form a catheter needle.

3. The invention in accordance with claim 2 wherein the penetrating element is suspended from a continuously moving conveyor.

4. The method of fabricating a catheter needle for insertion into a body cavity comprising a catheter and penetrating element wherein the penetrating element is adapted to be withdrawn by sliding the penetrating element rearwardly while the catheter is being held following insertion of the catheter needle into the body cavity comprising the steps of: providing a penetrating element in the form of a hypodermic needle having a hub with an opening therein at one end and a pointed beveled end at the other with an intermediary shank therebetween; dipping only the hub end of the needle in a first plastic resin in liquid phase to plug the opening therein, subjecting the plugged hub end to a first heat application to convert the plastic resin from a liquid to a solid phase; thereafter dipping the hub and shank of the penetrating element into a second plastic resin in liquid phase to a level adjacent its pointed end to coat the shank and hub with a continuous layer of the liquid resin; suspending the coated shank and hub from the pointed end of the penetrating element permitting the dipped resin to run off and flow under the influence of gravity sufficiently to obtain a predetermined taper and thickness so as to produce a tubular wall of gradually and progressively increasing thickness from a thin end having a substantial knife edge adjacent the pointed end of the penetrating element along the shank thereof toward the hub for substantially the entire length of said shank and substantially simultaneously subjecting the plastic resin to a second heat application which controls the extent of drip thereof by affecting its viscosity and, consequently, its thickness, then treating the plastic resin in liquid phase to a third heat application so as to convert it from a liquid to a solid phase; thereafter dipping the penetrating element into a third plastic resin in liquid phase of a thicker mixture than the second liquid plastic resin, to a point whereby the hub is immersed to produce a thicker and stiffer coating on the hub; thereafter treating the plastic resin coating of the third dipping step with a first application of heat to regulate the viscosity of this coating to a predetermined level to thereby control the extent of drip and then to a second heating application which converts the liquid resin of the third dipping step to a solid phase and partially cures it; and then severing the plastic resin around the hub and removing the end from the hub farthest the pointed end of the penetrating element, whereby to form a catheter needle.

5. The method of fabricating a catheter needle for insertion into a body cavity comprising a catheter and penetrating element wherein the penetrating element is adapted to be withdrawn by sliding the penetrating element rearwardly while the catheter is being held following insertion of the catheter needle into the body cavity comprising the steps of: providing a mandrel having the shape of a penetrating element, said mandrel having a hub portion and shank portion; dipping the hub and shank of the mandrel into a first plastic resin in liquid phase to coat said shank and hub portions with a continuous layer of liquid resin; thereafter subjecting the plastic resin with a first heat application to alter the viscosity of the plastic resin to a predetermined level and substantially simultaneously suspending the coated shank and hub from the end of the shank farthest from the hub and permitting the dipped resin layer to run off and flow under the influence of gravity sufficiently to obtain a predetermined taper and thickness so as to produce a tubular wall of gradually and progressively increasing thickness from a thin end having a substantial knife edge farthest from the hub; subjecting the coated mandrel to a second heat application to convert it from a liquid into a substantial solid phase; and then severing the plastic resin around the hub and removing the end from the hub farthest the shank portion of the mandrel so as to permit withdrawal of said mandrel from the catheter.

6. The method of fabricating a catheter needle for insertion into a body cavity comprising a catheter and penetrating element wherein the penetrating element is adapted to be withdrawn by sliding the penetrating element rearwardly while the catheter is being held following insertion of the catheter needle into the body cavity comprising the steps of: providing a mandrel having the shape of a penetrating element, said mandrel having a hub and shank portion; dipping the hub and shank of the mandrel into a first plastic resin in liquid phase to coat said shank and hub portions with a continuous layer of liquid resin; thereafter subjecting the plastic resin with a first application of heat to alter the viscosity of the plastic resin coating to a predetermined level and substantially simultaneously suspending the coated shank and hub from the end of the shank farthest from the hub and permitting the dipped resin layer to run off and flow under the influence of gravity sufficiently to obtain a predetermined taper and thickness so as to produce a tubular wall of gradually and progressively increasing thickness from a thin end having a substantial knife edge farthest from the hub; subjecting the coated mandrel to a second heat application to convert it from a liquid to a substantial solid phase; thereafter dipping the penetrating element into a second plastic resin in liquid phase of a thicker mixture than the first plastic resin to a point whereby the hub is immersed to produce a thicker and stiffer coating on the hub; thereafter treating the plastic resin of the second dipping step with a first application of heat to regulate the viscosity of this coating to a predetermined level to thereby control the extent of drip and then to a second heating application to convert the liquid resin of the second dipping step to a substantially solid phase and partially cure it; then severing the plastic resin around the hub and removing the end from the hub farthest the shank portion of the mandrel so as to permit withdrawal of said mandrel from the catheter so formed.

References Cited

UNITED STATES PATENTS

| | | | |
|---|---|---|---|
| 2,561,569 | 7/1951 | Flyn | 264—172 |
| 2,786,238 | 3/1957 | Shapero | 264—303 |
| 2,966,703 | 1/1961 | Harman | 264—279 |
| 3,022,540 | 2/1962 | Shapero | 18—24 |
| 2,332,589 | 10/1943 | Moss | 264—303 |
| 2,128,827 | 8/1938 | Killian | 264—303 |
| 2,299,039 | 10/1942 | Scherer | 264—318 |

ROBERT F. WHITE, *Primary Examiner.*

R. B. MOFFITT, S. I. LANDSMAN,
*Assistant Examiners.*